United States Patent
Freeman et al.

(10) Patent No.: US 8,657,368 B2
(45) Date of Patent: Feb. 25, 2014

(54) HYDROFORMED SIDE PILLAR TO LOWER BACK JOINT STRUCTURE

(75) Inventors: Mike James Freeman, Allen Park, MI (US); Philip John Leonetti, Plymouth, MI (US); Gene A. Senn, Ann Arbor, MI (US); Christopher Kunkel, Macomb Township, MI (US); Shadi M. Al-Thabteh, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/547,068

(22) Filed: Jul. 12, 2012

(65) Prior Publication Data

US 2014/0015283 A1    Jan. 16, 2014

(51) Int. Cl.
*B62D 25/02* (2006.01)

(52) U.S. Cl.
USPC ........... 296/203.03; 296/29; 296/30; 296/205

(58) Field of Classification Search
USPC .................. 296/203.04, 205, 203.03, 203.01, 296/193.06, 29, 30
See application file for complete search history.

(56) References Cited

U.S. PATENT DOCUMENTS

| | | | | |
|---|---|---|---|---|
| 5,116,161 A | * | 5/1992 | Faisst | 403/231 |
| 6,623,067 B2 | * | 9/2003 | Gabbianelli et al. | 296/205 |
| 6,824,204 B2 | * | 11/2004 | Gabbianelli et al. | 296/205 |
| 8,414,068 B1 | * | 4/2013 | Na et al. | 296/193.06 |
| 2012/0119546 A1 | * | 5/2012 | Honda et al. | 296/203.01 |
| 2013/0088033 A1 | * | 4/2013 | Wada et al. | 296/29 |

* cited by examiner

*Primary Examiner* — Dennis Pedder
*Assistant Examiner* — Beverly Becker
(74) *Attorney, Agent, or Firm* — Joseph E. Root

(57) ABSTRACT

A mechanism for increasing stiffness of the side-structure of a vehicle, for transferring loads and strain energy, and for improving rigidity from the lower portion of a side pillar, to the underbody structural components of the vehicle. The vehicle includes a hydroformed tube having a horizontal portion, a vertical portion and an arcuate central portion. The upper end of the vertical portion is spot welded to the lower portion of the side pillar. The horizontal portion is received into, and spot welded to, an inner portion of a structural member. The structural member is an L-shaped bracket, and its major portion is spot welded to an inner portion of an elongated beam. The beam is fixedly attached to the side rail of the vehicle. The tubular member, the structural member, and the elongated beam, when connected, form a closed continuous box shaped structure, which reinforces the side-structure of the vehicle.

3 Claims, 3 Drawing Sheets

HYDROFORMED SIDE PILLAR TO LOWER BACK JOINT STRUCTURE

TECHNICAL FIELD

This disclosure relates to 'Body in White' (BIW) vehicle structures, and, more particularly, to improved BIW vehicle structures designs for better load transfer and structural rigidity of BIW vehicle structural components, resulting in improved safety, durability, NVH & weight performance.

BACKGROUND

"Body in white" (BIW) refers to the stage in an automobile's manufacturing where the majority of the metallic components of the automobile are welded together, before adding other subsequent parts and sub-assemblies. The structure connecting the body side of a vehicle to its lower back joints is extremely critical for maintaining the overall torsional stiffness of the body in white structure. Many conventional mechanisms and structures have been deployed for increasing the rigidity (stiffness) and load transferring virtue of the body side structure. These structures are typically disposed between the lower portion of a specific side-pillar of the vehicle and the corresponding underbody structure underneath, mainly due to certain limitations in the assembly process. However, a major problem in the currently deployed structures/mechanism is their low effectiveness in transferring loads and maintaining rigidity between the lower portion of the side pillars, to the underbody structure. Further, unibody vehicles generally use body panels and a floor pan that contributes to their structure, and their main body structure is fairly stable, as their center of gravity lies within the lower portion of the vehicle. Specifically, the underbody structure in many unibody vehicles has more strength compared to the upper portions, and hence, an effective strain energy transfer towards the underbody structure in such vehicles is an extremely critical aspect for maintaining side structure's stiffness and stability.

In many vehicles, certain hollow tubular members are welded to the side frame of the vehicle to increase the strength of the side structure. In one such example, two hollow tubular members are mounted on the side frame of the vehicle that receives the door, and the members are joined together by a non-tubular reinforcement member. The reinforcement member takes the stress away from the curved corners of the side frame, and prevents the concentration of stress at the joints. However, the mechanism is not efficient in reinforcing the side structure, and in transferring loads and developing adequate stiffness between the side pillar & underbody members.

Considering these problems, there is a need for an effective and efficient mechanism for reinforcing the side structure of a vehicle, and for increasing load transfer & stiffness between the side frame to the underbody structure of the vehicle.

SUMMARY

The present disclosure describes a mechanism disposed between a side pillar of a vehicle and a bottom portion of a side structure of the vehicle, for facilitating efficient load transfer from the side pillar to the underbody structural components of the vehicle. The mechanism also maintains rigidity between the side pillar and the underbody structural components of the vehicle.

In one aspect, the present disclosure provides a vehicle having a side-support structure positioned and mounted between the lower portion of a side-pillar, and a bottom portion of the side structure of the vehicle. The mechanism includes a substantially elongated and tubular member having a vertical portion, a horizontal portion and a central arcuate portion that connects the horizontal and vertical portions. A structural member receives the horizontal portion of the tubular member, and specifically, the horizontal portion is fixedly attached to an inner portion of the structural member. The vertical portion of the tubular member is fixedly attached to the lower portion of the side-pillar of the vehicle. An elongated beam is attached to the bottom portion of the side structure of the vehicle, and preferably, to a portion of the side rail proximal to the side pillar. The elongated beam receives the structural member, and specifically, the structural member is fixedly attached to, and remains substantially within an end portion of the elongated beam. The tubular member is a substantially hollow tube formed by hydroforming. However, extruded materials or bent tube stocks can also be used to manufacturing the tubular member. The structural member, the tubular member and the elongated beam form a continuous box-type structure, when connected to each other, and this structure easily takes load from the lower portion of the side pillar, and transfers it to the underbody structural components of the vehicle.

In another aspect, the present disclosure provides a method of increasing stiffness of a side-structure of a vehicle, for reinforcing the side-structure, and for increasing load transfer from the side structure to the underbody structural components of the vehicle. The method mounts a tubular member between the lower portion of a side pillar and a portion of the side structure. The tubular member has a vertical portion, a horizontal portion and a central arcuate portion connecting the vertical and horizontal portions. The method attaches the horizontal portion of the tubular member to an inner portion of a structural member, and receives the structural member into an end portion of an elongated beam. An upper end of the vertical portion of the tubular member is attached to the lower portion of the side pillar, and the elongate member is fixedly attached to a bottom portion of the side structure of the vehicle, preferably to the side rail underneath the side pillar.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description illustrates aspects of the disclosure and the ways it can be implemented. However, the description does not define or limit the invention, such definition or limitation being solely contained in the claims appended thereto. Although the best mode of carrying out the invention has been disclosed, those in the art would recognize that other embodiments for carrying out or practicing the invention are also possible.

During manufacturing of vehicles, the connection of the body side structure to the lower back joints is critical for maintaining overall torsional stiffness, the noise, vibration and Harshness (NVH) characteristics, durability and safety of the body-in-white structure. Unibody vehicles generally use body panels and floor pan to form their structure. Specifically, for unibody vehicles without a package tray, maintaining the overall stiffness of the side structure of such vehicles is an important parameter during manufacturing. Conventional attempts in this respect include developing mechanisms that connect and secure the lower portions of the different side-pillars of a vehicle to the underbody structure. However, most of these have been only partially successful in effectively and efficiently transferring loads from the side pillar towards the underbody structural components of the vehicle.

The present disclosure describes a mechanism for connecting the lower portion of a side-pillar of a vehicle to the underbody structural components of the vehicle. The mechanism effectively transfers loads and strain energy from the side pillar to the underbody structural components, and increases the stiffness between the side-pillar and the underbody structural components, by providing reinforcement to the side structure. Further, the NVH characteristics, durability, safety and weight performance of the vehicle's BIW structure.

Figure 1:
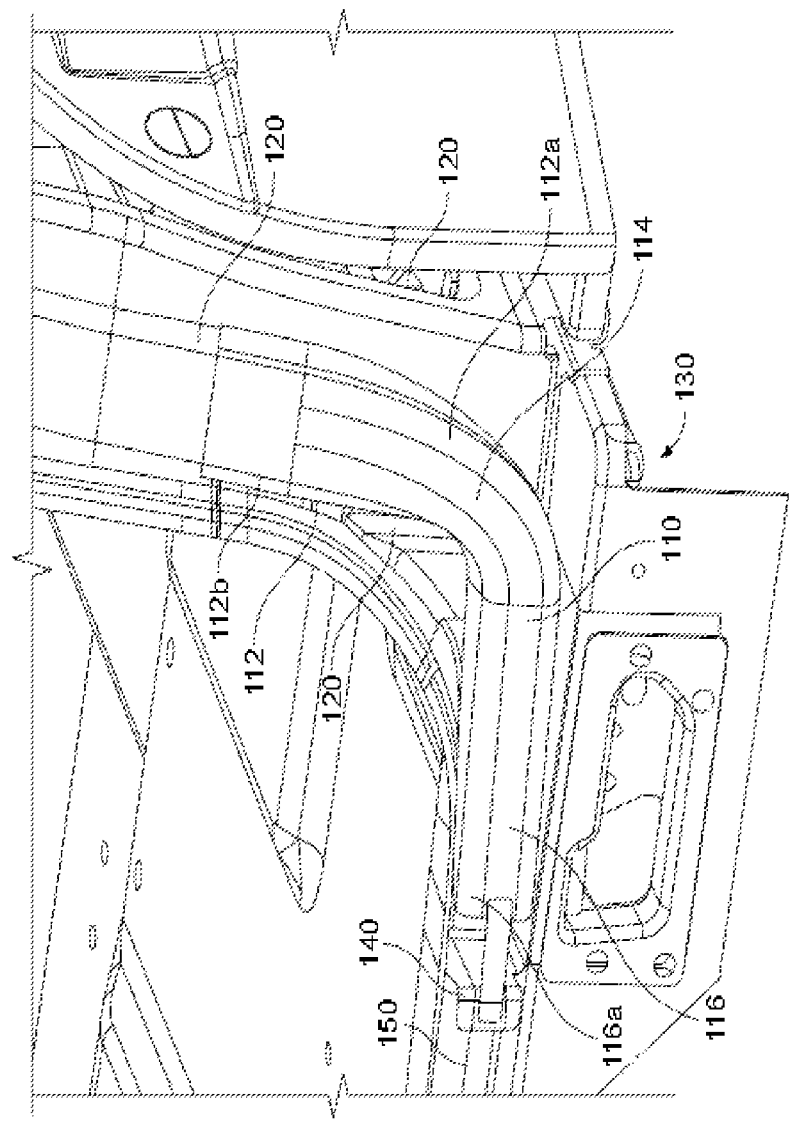
FIG. 1 illustrates a side-view of a rear portion of a vehicle, showing the mechanism of the present disclosure mounted below a side-pillar.

FIG. 1 shows a side view of a rear portion of a vehicle, depicting the mechanism of the present disclosure mounted between the lower portion of a D-pillar and the underbody structural components of a vehicle. As shown, the mechanism includes an elongated member 110 connecting the lower portion of a D-pillar 120 of the vehicle to the underbody structure 130. The elongated member 110 is substantially tubular, and includes a vertical portion 112, an arcuate central portion 114 and a horizontal portion 116. The vertical portion 112 has a lower end 112 (a) and an upper end 112 (b). The cross-section of the vertical portion 112 continuously flattens from the lower end 112 (a) to the upper end 112 (b). This facilitates easy attachment of the vertical portion to the side pillar 120. The exact structure and shape of the tubular member 110 will be explained in details hereinafter, in conjunction with subsequent figures of the disclosure. The upper end 112 (b) is attached to a lower portion of the D-pillar 120 of the vehicle. An end 116 (a) of the horizontal member 116 is attached to a structural member 140. The structural member 140 is a bracket, and has an open-ended structure to facilitate insertion of the horizontal portion 116 therein. Specifically, as shown, the structural member 140 receives the end 116 (a) of the horizontal portion 116. When in a position being connected to the structural member 140, a substantial portion of the horizontal member 116 remains within the structural member 140. To fixedly attach the horizontal member 116 to the structural member 140, the horizontal member 116 is spot welded to an inner surface of the structural member 140 at multiple locations. However, in certain less preferred embodiments, any other suitable methods can also be alternatively used for attaching the members 116 and 140 to each other. Typical examples of such methods may including the other forms of welding, are laser welding, Gas-shield Arc (MIG/MAC) welding, soldering, brazing, adhesive bonding, or fastening of the two members to each other. Further, a combination of two or more of such methods of attachments may also be used to attach the two members to each other. In a case where the member 140 is fastened to the member 116, multiple openings may be provided at appropriate locations on the surfaces of the members 140 and 116, and a set of bolts (fasteners) can be used for the purpose.

As shown, the horizontal portion 116 preferably has a rectangular cross-section. The structural member is an L-shaped bracket, having an open ended structure. The rectangular cross-section of the horizontal portion 116 facilitates its assembly with the L-shaped structure of the structural member 140. In certain less preferred embodiments, the structural member 140 can also have another appropriate shape, and the horizontal portion 116 of the tubular member 110 may have an accordingly different shape, to facilitate assembly of the horizontal position 116 and the structural member 140. After being inserted, the horizontal portion 140 is spot-welded at multiple locations to the inner portions structural member 140. The exact locations for spot welding are explained in details hereinafter, in conjunction with subsequent figures.

The tubular member 110 is formed by the process of hydroforming. Those skilled in the art know that in the automotive industry, many of the complex shapes in unibody vehicles are formed using the hydroforming technique, to make lighter, stronger and rigid structures. Further, hydroforming uses a pressurized hydraulic fluid within a mold shaped into a desired result, to form a desired shape. Specifically, the tubular member 110 is formed by using a mold having a shape similar to it, and introducing a pressurized flow of a hydraulic fluid into the mold. In an embodiment, different molds, having shapes similar to the different portions of the tubular member 110, for e.g., the vertical portion 112, the arcuate portion 114, etc., can be used separately to manufacture different components of the tubular member 110, and the individually manufactured components can then be fused together to form the entire tube. Further, in an embodiment, the tubular member 110 may also have a uniformly rectangular or square cross-section all through its entire length.

Preferably, the tubular member 110 is made of an appropriate metal or metallic alloy, including steel or Aluminium. However, in certain embodiments, other materials/alloys, including extruded materials, can also be used. Other suitable material supporting load and strain energy transfer can also be used, to facilitate substantial transformation of loads towards the underbody structure of the vehicle.

An elongated beam 150 receives the structural member 140. The elongated beam 150 (referred to as 'beam 150' hereinafter) is attached to a bottom side structure of the vehicle, and preferably, to the portions of the bottom side rail proximal to the D-pillar. The exact shape and structure of the elongated beam and the structural member 140 will be explained hereinafter, in conjunction with one of the subsequent figures depicting a disassembled view of the mechanism of the present disclosure. The structural member 140 remains substantially within an end portion of the beam 150, and is spot-welded at different locations to the beam. The tubular member 110, structural member 140 and the elongated beam 150, when connected to each other, in this manner, form a continuous box-type structure. This box-type structure easily carries loads from the lower portion of the D-pillar 120 to the underbody members.

Figure 2:
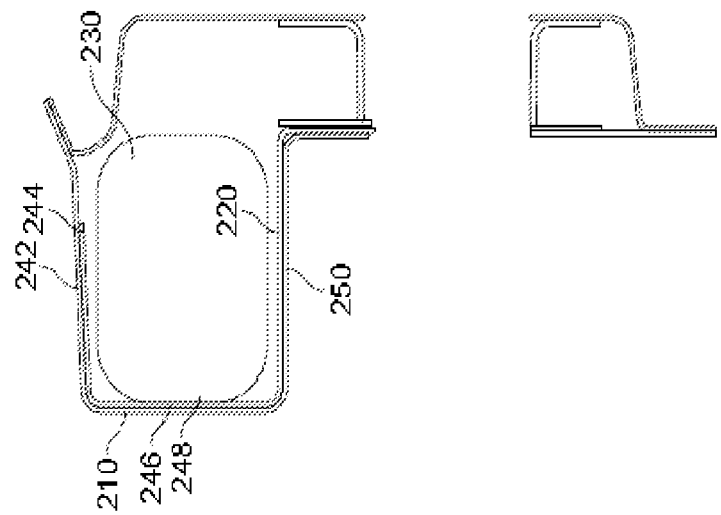
FIG. 2 illustrates another side-view of the rear portion, and a cross-sectional view showing the connecting points between different components of the mechanism in accordance with the present disclosure.
Figure 2:
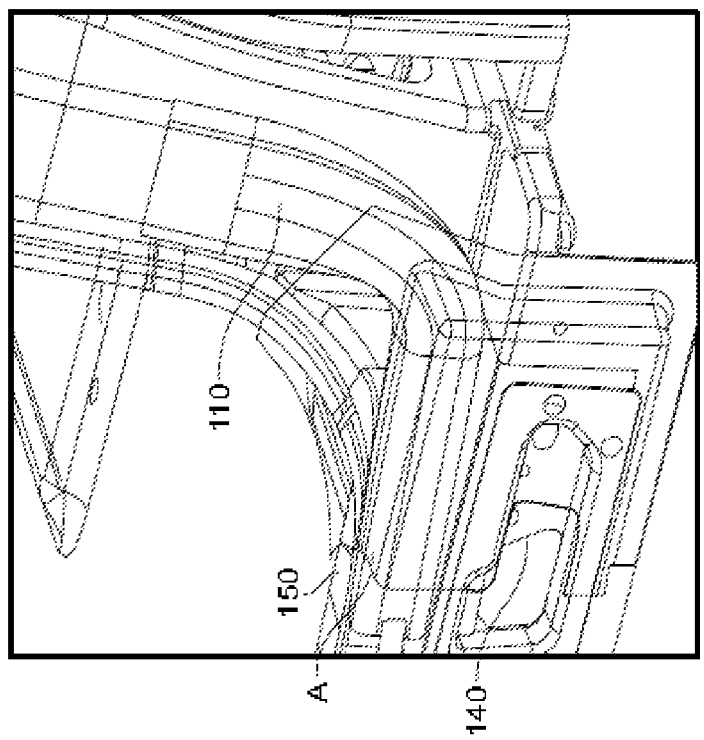

FIG. 2 shows another side-view of a vehicle, depicting the mechanism of the present disclosure mounted between the lower portion of a D-pillar of the vehicle and the underbody structure. The diagram on the right top is a sectional view of the mechanism, taken along a path A, as shown. The sectional view clearly shows the different regions where the tubular member 110, the structural member 140 and the elongated beam 150 engage with each other. As shown, the outer curve 210 represents the cross-section of the elongated beam 150, the inner curve 220 represents the structural member 140, and the innermost curve 230 represents the cross-section of the tubular member 110. Specifically, the curve 230 represents the cross-section of the portion of the tubular member 110, taken along the region where it engages with the structural member 140. The structural member 140 is spot-welded to the elongated beam 150 at multiple locations. Specifically, two cross marks 242 and 244, and a bottom cross-mark 250 represent the locations where the structural member 140 is spot-welded to the elongated beam 150. Although three such welding locations have been shown, the structural member 140 may also be welded to the elongated beam 150 at many other locations. The two left crosses 246 and 248 are the locations where the tubular member 110 is spot-welded to the inner portion of the structural member 140. Other appropriate suitable methods can also be alternatively used, to attach the tubular member 110 to the inner portion of the structural member 140, and to attach the structural member 140 to the elongated beam 150. Further, even though spot-welding is preferred, other suitable welding techniques, for e.g., seam welding, butt welding, etc., can also be used.

Figure 3:
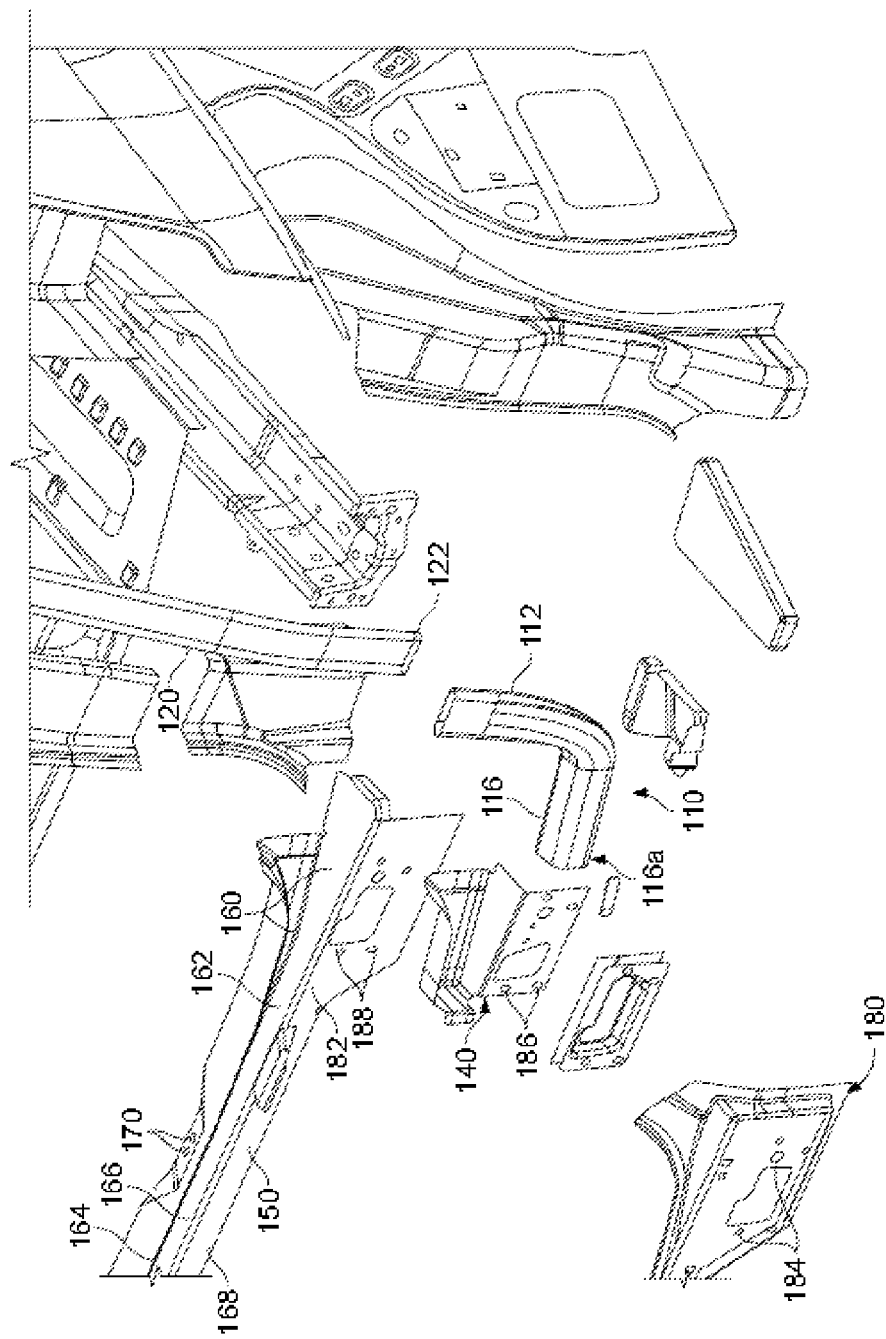
FIG. 3 illustrates an exploded view of the mechanism of the present disclosure, depicting the different components of the mechanism.

FIG. 3 illustrates a disassembled view, showing the different components of a vehicle's side-support structure, in accordance with the present disclosure. The elongated beam 150, as shown, has an end portion 160 for receiving the structural member 140. As aforementioned and shown herein clearly, the structural member 140 is an L-shaped bracket, and the end portion 160 of the elongated beam 150 has an L-shaped cross-section to receive this L-shaped bracket. Further, the portion of the elongated beam 150 extending between the point 162 and the distal end 164, includes two plates inclined substantially perpendicular to each other. Specifically, a horizontal plate 166 and a vertical plate 168 are joined together, and enclose an open space for mounting the elongated beam 150 to the side rail of the vehicle. Multiple openings 170 are provided within the horizontal plate 166, to facilitate fastening of the elongated beam 150 to the vehicle's side rail. Further, the elongated beam 150 is also welded to the side rail at different locations (though not shown), to strengthen the fixture of the beam to the side rail.

The flattened top end of the vertical portion 112 of the tubular member 110 is fixedly attached to the lower end 122 of the D-pillar 120 of the vehicle. The rectangular shaped end 116 (a) of the horizontal portion 116, is received into, and assembled to the structural member 140. The structural member 140 is received into, and fixedly attached to the inner surface of the end portion 160 of the beam 150. Another member 180 is attached to, and fits on the outer portion 182 of the beam 150, after the structural member 140 and the tubular member 110 have been inserted and fixedly attached within the beam 150. The member 180 has a shape similar to and slightly larger than the shape of the outer portion 182, to facilitate its fitting thereon. Further, multiple openings 184 are provided within the member 180, which are aligned in level with a number of openings 186 in the structural member 140 and similarly, with openings 188 in the outer portion 182 of the beam 150. A set of fasteners is used to firmly attach the member 180 to the elongated beam 150. In this manner, in the assembled state of the mechanism, the elongated beam 150, the structural member 140, and the member 180 form a closed continuous box-shaped section. Being fixed to the bottom side rail of the vehicle, this closed box-shaped section easily transfers the loads carried by the tubular member 110 from the D-pillar 120, towards the underbody structural members of the vehicle, and reinforces the side structure of the vehicle.

The mechanism of the present disclosure is extremely effective in certain situations, for example, when the vehicle is taking a sharp turn or, or in a case where the left front and the right rear suspension mounting points of the vehicle are in compression, and the right front and left rear suspension mounting points are in tension. The radial loads experienced by the side structure, due to centrifugal force, while taking a sharp turn, and the tangential loads in cases where the vehicle accelerates or decelerates during turning, are effectively transferred by the mechanism, towards the underbody components.

The mechanism of the present disclosure has been explained through an embodiment where it is mounted between a D-pillar of the vehicle and the underbody structure, however, the same mechanism can also be mounted below any specific side pillar of the vehicle, for example, a B-pillar, a C-pillar, etc. Further, though the mechanism is extremely advantageous in unibody vehicles, it can also be used for other designs, for example, "body on frame" design vehicles too. The mechanism can be incorporated in any kind of vehicle, such as SUVs, cars, etc.

Although the current invention has been described comprehensively, in considerable details to cover the possible aspects and embodiments, those skilled in the art would recognize that other versions of the invention are also possible.

What is claimed is:

1. A vehicle having a side-support structure, the side support structure comprising:
   a tubular member having a vertical portion, a horizontal portion and a central arcuate portion connecting the vertical and horizontal portions; and
   a structural member configured to receive the horizontal portion of the tubular member, the horizontal portion being fixedly attached to the structural member, wherein:
      the vertical portion of the tubular member is attached to the lower portion of a side-pillar of the vehicle, and the tubular member is configured to transfer load from the side pillar to an underbody structure of the vehicle, the tubular member having a continuously flattening cross-section from a lower end thereof to an upper end thereof; and
      an elongate beam attached to a bottom side structure of the vehicle, the elongate beam being configured to receive the structural member at least partially, the structural member being fixedly attached to, and remaining substantially within an end portion of the elongate beam.

2. A vehicle having a side-support structure, the side support structure comprising:
   a tubular member having a vertical portion, a horizontal portion and a central arcuate portion connecting the vertical and horizontal portions;
   a structural member configured to receive the horizontal portion of the tubular member, the horizontal portion being fixedly attached to the structural member, wherein:
      the vertical portion of the tubular member is attached to the lower portion of a side-pillar of the vehicle, and the tubular member is configured to transfer load from the side pillar to an underbody structure of the vehicle; and
      an elongate beam attached to a bottom side structure of the vehicle, the elongate beam being configured to receive the structural member at least partially, the structural member being fixedly attached to, and remaining substantially within an end portion of the elongate beam;

wherein the structural member has an L-shaped cross-section and the horizontal portion of the tubular member has a rectangular cross-section, and the tubular member remains located substantially within the structural member, in an assembled configuration of the side-support structure.

3. A vehicle having a side-structure of claim 2, the side support structure comprising:
- a tubular member having a vertical portion, a horizontal portion and a central arcuate portion connecting the vertical and horizontal portions; and
- a structural member configured to receive the horizontal portion of the tubular member, the horizontal portion being fixedly attached to the structural member, wherein:
  - the vertical portion of the tubular member is attached to the lower portion of a side-pillar of the vehicle, and the tubular member is configured to transfer load from the side pillar to an underbody structure of the vehicle; and
  - an elongate beam attached to a bottom side structure of the vehicle, the elongate beam being configured to receive the structural member at least partially, the structural member being fixedly attached to, and remaining substantially within an end portion of the elongate beam;
  - wherein the end portion of the elongate beam receiving the structural member is substantially L-shaped, to facilitate engagement of the structural member with the elongate beam.

* * * * *